United States Patent
Iwata

(10) Patent No.: US 10,869,207 B2
(45) Date of Patent: Dec. 15, 2020

(54) MONITORING APPARATUS, RADIO APPARATUS, COMMUNICATION SYSTEM, METHODS THEREIN, AND NON-TRANSITORY COMPUTER READABLE MEDIUM

(71) Applicant: NEC CORPORATION, Tokyo (JP)

(72) Inventor: Hajime Iwata, Tokyo (JP)

(73) Assignee: NEC CORPORATION, Tokyo ( * ) Notice: Subject to any disclaimer, the term of this patent is extended or adjusted under 35 U.S.C. 154(b) by 0 days.

(21) Appl. No.: 15/753,677

(22) PCT Filed: Aug. 8, 2016

(86) PCT No.: PCT/JP2016/003648
§ 371 (c)(1),
(2) Date: Feb. 20, 2018

(87) PCT Pub. No.: WO2017/029788
PCT Pub. Date: Feb. 23, 2017

(65) Prior Publication Data
US 2018/0249353 A1      Aug. 30, 2018

(30) Foreign Application Priority Data

Aug. 18, 2015   (JP) .................................. 2015-160851

(51) Int. Cl.
*H04W 24/02* (2009.01)
*H04W 68/02* (2009.01)
(Continued)

(52) U.S. Cl.
CPC ......... *H04W 24/02* (2013.01); *H04L 27/0012* (2013.01); *H04W 8/005* (2013.01);
(Continued)

(58) Field of Classification Search
CPC ..... H04W 24/02; H04W 68/02; H04W 8/005; H04W 64/006; H04L 27/0012
See application file for complete search history.

(56) References Cited

U.S. PATENT DOCUMENTS

| | | | |
|---|---|---|---|
| 6,778,523 B1* | 8/2004 | Masilamany | H04L 45/00 370/351 |
| 8,553,821 B1* | 10/2013 | Eliaz | H04L 25/03197 375/348 |
| 2008/0233951 A1* | 9/2008 | Uchida | H04W 48/18 455/425 |

(Continued)

FOREIGN PATENT DOCUMENTS

| | | |
|---|---|---|
| JP | 2004-140459 | 5/2004 |
| JP | 2010-103686 A | 5/2010 |

(Continued)

OTHER PUBLICATIONS

International Search Report for PCT/JP2016/003648 dated Oct. 25, 2016 [PCT/ISA/210].

*Primary Examiner* — Rasheed Gidado
(74) *Attorney, Agent, or Firm* — Sughrue Mion, PLLC

(57) ABSTRACT

A monitoring apparatus according to the present disclosure includes: a notification information reception unit (110) configured to receive notification information from a radio apparatus; a determination unit (120) configured to determine an initial parameter that corresponds to the notification information that has been received; and an initial parameter transmission unit (130) configured to transmit the initial parameter that has been determined to the radio apparatus. It is therefore possible to provide a monitoring apparatus, a radio apparatus, a communication system, methods therein, and a program capable of automating initial parameter configuration in accordance with a purpose of installing the radio apparatus.

5 Claims, 6 Drawing Sheets

(51) Int. Cl.
*H04W 64/00* (2009.01)
*H04W 8/00* (2009.01)
*H04L 27/00* (2006.01)
*H04W 88/18* (2009.01)

(52) U.S. Cl.
CPC ......... *H04W 64/006* (2013.01); *H04W 68/02* (2013.01); *H04W 88/18* (2013.01)

(56) References Cited

U.S. PATENT DOCUMENTS

| | | | | |
|---|---|---|---|---|
| 2009/0268686 | A1* | 10/2009 | Yamada | H04B 7/0673 370/330 |
| 2010/0002642 | A1* | 1/2010 | Ito | H04L 1/0026 370/329 |
| 2010/0074165 | A1* | 3/2010 | Yokota | H04L 12/12 370/315 |
| 2010/0323699 | A1* | 12/2010 | Hashimoto | H04W 24/02 455/436 |
| 2011/0164660 | A1* | 7/2011 | Hosono | H04W 24/02 375/140 |
| 2012/0270590 | A1* | 10/2012 | Lu | H04W 48/10 455/518 |
| 2015/0200746 | A1* | 7/2015 | Pan | H04L 1/00 370/329 |
| 2016/0088431 | A1* | 3/2016 | Yamamura | H04W 4/029 455/456.1 |
| 2016/0249244 | A1* | 8/2016 | Xia | H04L 1/0023 |

FOREIGN PATENT DOCUMENTS

| | | |
|---|---|---|
| JP | 2010-283638 A | 12/2010 |
| JP | 2011-151587 A | 8/2011 |
| JP | 2011-199540 A | 10/2011 |
| JP | 2013-516861 A | 5/2013 |
| WO | 2009/148162 A1 | 12/2009 |

* cited by examiner

MONITORING APPARATUS, RADIO APPARATUS, COMMUNICATION SYSTEM, METHODS THEREIN, AND NON-TRANSITORY COMPUTER READABLE MEDIUM

CROSS REFERENCE TO RELATED APPLICATIONS

This application is a National Stage of International Application No. PCT/JP2016/003648 filed Aug. 8, 2016, claiming priority based on Japanese Patent Application No. 2015-160851 filed Aug. 18, 2015.

TECHNICAL FIELD

The present disclosure relates to a monitoring apparatus, a radio apparatus, a communication system, methods therein, and a program.

BACKGROUND ART

Radio apparatuses are frequently added, moved, and replaced by new ones. In accordance with the addition, the movement, and the replacement, it is required to perform initial configuration work of the radio apparatuses. While it is known that the initial configuration work of the radio apparatuses is manually performed, it takes much time and causes much trouble to initially configure the radio apparatuses one by one by walking around the place where the radio apparatuses are installed. Further, when the initial configuration work of the radio apparatuses is performed manually, an erroneous configuration may be induced.

Further, depending on whether the radio apparatus is installed as an apparatus of a core network, an apparatus of an access network, or an end terminal, the initial parameter configuration that should be configured in advance varies. By storing all the initial parameter configurations for installation purposes different from one another in the radio apparatus in advance, the initial configuration work when the radio apparatus is installed is reduced. However, it is difficult to store all the initial configuration values for installation purposes different from one another in the radio apparatus due to limitations of a memory of the radio apparatus.

Patent Literature 1 discloses a technique in which a monitoring apparatus obtains bandwidth of a transmission path based on information sent from a radio access apparatus. However, the technique disclosed in Patent Literature 1 is not related to the initial parameter configuration of the radio access apparatus.

CITATION LIST

Patent Literature

[Patent Literature 1] Japanese Unexamined Patent Application Publication No. 2011-151587

SUMMARY OF INVENTION

Technical Problem

As described above, there is a problem in the radio apparatus mentioned in Background Art that it takes much time and trouble to manually perform the initial configuration work of the radio apparatuses. Further, there is a problem that, when the initial configuration work of the radio apparatuses is manually performed, an erroneous configuration is induced. Further, storing all the initial configuration values for installation purposes different from one another in the radio apparatus is also difficult due to the limitations of the memory of the radio apparatus.

The present disclosure has been made in order to solve the aforementioned problems and aims to provide a monitoring apparatus, a radio apparatus, a communication system, methods therein, and a program capable of automating the initial parameter configuration in accordance with the purpose of installing the radio apparatus.

Solution to Problem

A monitoring apparatus according to a first aspect of the present disclosure includes: notification information reception means for receiving notification information from a radio apparatus; determination means for determining an initial parameter that corresponds to the notification information that has been received; and initial parameter transmission means for transmitting the initial parameter that has been determined to the radio apparatus.

A radio apparatus according to a second aspect of the present disclosure includes: detection means for detecting information on the radio apparatus; notification information transmission means for transmitting the information that has been detected to a monitoring apparatus as notification information; initial parameter reception means for receiving the initial parameter determined based on the notification information from the monitoring apparatus; and configuration means for configuring the initial parameter that has been received as an initial parameter of the radio apparatus.

A communication system according to a third aspect of the present disclosure includes a monitoring apparatus and a radio apparatus, in which the monitoring apparatus includes: notification information reception means for receiving notification information from the radio apparatus; determination means for determining an initial parameter that corresponds to the notification information that has been received; and initial parameter transmission means for transmitting the initial parameter that has been determined to the radio apparatus, and the radio apparatus includes: detection means for detecting information on the radio apparatus; notification information transmission means for transmitting the information that has been detected to the monitoring apparatus as the notification information; initial parameter reception means for receiving the initial parameter determined based on the notification information from the monitoring apparatus; and configuration means for configuring the initial parameter that has been received as an initial parameter of the radio apparatus.

A method in a monitoring apparatus according to a fourth aspect of the present disclosure includes: receiving notification information from a radio apparatus; determining an initial parameter that corresponds to the notification information that has been received; and transmitting the initial parameter that has been determined to the radio apparatus.

A method in a radio apparatus according to a fifth aspect of the present disclosure includes: detecting information on the radio apparatus; transmitting the information that has been detected to a monitoring apparatus as notification information; receiving an initial parameter determined based on the notification information from the monitoring apparatus; and configuring the initial parameter that has been received as an initial parameter of the radio apparatus.

In a method in a communication system including a monitoring apparatus and a radio apparatus according to a sixth aspect of the present disclosure, the radio apparatus detects information on the radio apparatus and transmits the information that has been detected to a monitoring apparatus as notification information, the monitoring apparatus receives the notification information from the radio apparatus, determines an initial parameter that corresponds to the notification information that has been received, and transmits the initial parameter that has been determined to the radio apparatus, and the radio apparatus configures the initial parameter that has been received as an initial parameter of the radio apparatus.

In a program for causing a computer to execute a method in a monitoring apparatus according to a seventh aspect of the present disclosure, the method includes receiving notification information from a radio apparatus; determining an initial parameter that corresponds to the notification information that has been received; and transmitting the initial parameter that has been determined to the radio apparatus.

Advantageous Effects of Invention

According to the present disclosure, it is possible to provide a monitoring apparatus, a radio apparatus, a communication system, methods therein, and a program capable of automating the initial parameter configuration in accordance with the purpose of installing the radio apparatus.

DESCRIPTION OF EMBODIMENTS

First Embodiment

Figure 1:
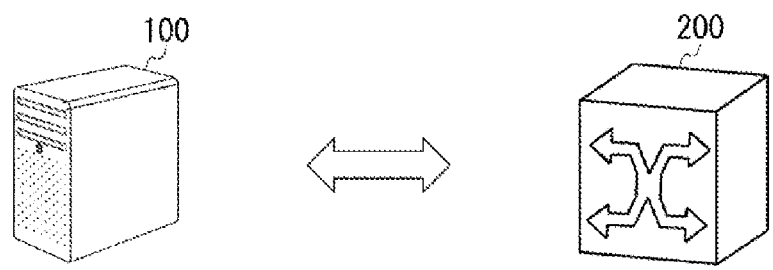
FIG. 1 is a block diagram showing a configuration of a communication system according to a first embodiment of the present disclosure.

With reference first to FIG. 1, a configuration of a communication system according to a first embodiment of the present disclosure will be explained. The communication system according to the first embodiment includes a monitoring apparatus 100 and a radio apparatus 200. In this communication system, the monitoring apparatus 100 communicates with the radio apparatus 200.

The monitoring apparatus 100 is, for example, a Network Management System (NMS). The monitoring apparatus 100 is not limited to the NMS and may be any apparatus that is able to monitor or manage the radio apparatus 200.

The radio apparatus 200 is an apparatus that belongs to a core network, an apparatus that belongs to an access network, or an apparatus that is installed to be used as an end terminal. The end terminal is, for example, a radio base station apparatus. Further, the access network is a network that connects the core network and the end terminal to each other.

Figure 2:
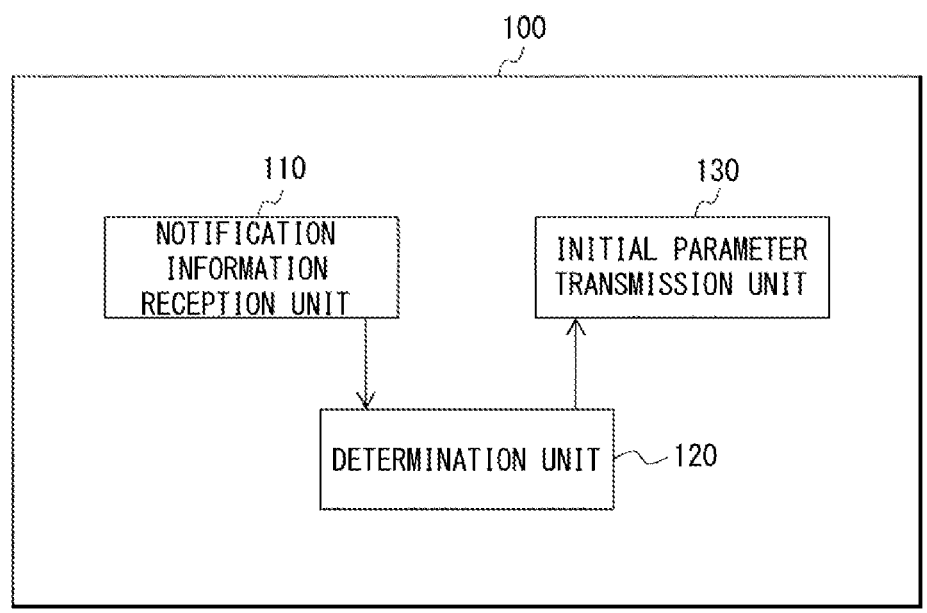
FIG. 2 is a block diagram showing a configuration of a monitoring apparatus according to the first embodiment of the present disclosure.

With reference next to FIG. 2, a configuration of the monitoring apparatus 100 according to the first embodiment of the present disclosure will be explained. The monitoring apparatus 100 includes a notification information reception unit 110, a determination unit 120, and an initial parameter transmission unit 130.

The notification information reception unit 110 receives notification information from the radio apparatus 200. Further, the notification information reception unit 110 outputs the notification information that has been received to the determination unit 120. The notification information is information detected by the radio apparatus 200 and is sent to the monitoring apparatus 100. Further, the notification information is information that may have different values in accordance with the purpose of installing the radio apparatus 200. A specific example of the notification information may be, for example, information indicating the modulation scheme of the radio apparatus 200.

The determination unit 120 receives the notification information from the notification information reception unit 110. Further, the determination unit 120 determines an initial parameter that corresponds to the notification information that has been received. The initial parameter is an initial parameter to be configured in the radio apparatus 200. A specific example of the initial parameter may be, for example, a bandwidth control template. The bandwidth control template is a set of profiles composed of a plurality of profiles for bandwidth control. The determination unit 120 determines the initial parameter that corresponds to the notification information that has been received using, for example, a table for initial parameters that includes a plurality of initial parameters and application conditions of the plurality of respective initial parameters. Using the table for initial parameters is just one example of the method of determining the initial parameter, and the initial parameter that corresponds to the notification information that has been received may be determined without using the table for initial parameters. Further, the determination unit 120 outputs the initial parameter that has been determined to the initial parameter transmission unit 130.

The initial parameter transmission unit 130 receives the initial parameter from the determination unit 120. Further, the initial parameter transmission unit 130 transmits the initial parameter that has been received to the radio apparatus 200.

Figure 3:
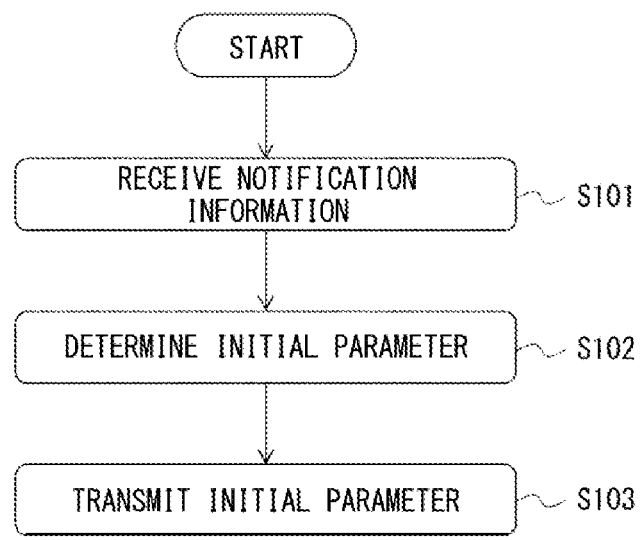
FIG. 3 is a flowchart showing processing of the monitoring apparatus according to the first embodiment of the present disclosure.

With reference next to the flowchart shown in FIG. 3, processing of the monitoring apparatus 100 according to the first embodiment of the present disclosure will be explained.

First, the notification information reception unit 110 receives the notification information from the radio apparatus 200 (S101). Next, the determination unit 120 determines the initial parameter that corresponds to the notification information that has been received (S102). Next, the initial parameter transmission unit 130 transmits the initial parameter that has been determined to the radio apparatus (S103).

As described above, the monitoring apparatus 100 according to the first embodiment is configured to determine the initial parameter that corresponds to the notification information received from the radio apparatus 200 and transmit the initial parameter that has been determined to the radio apparatus. It is therefore possible to achieve the monitoring apparatus capable of automating the initial parameter configuration in accordance with the purpose of installing the radio apparatus.

Figure 4:
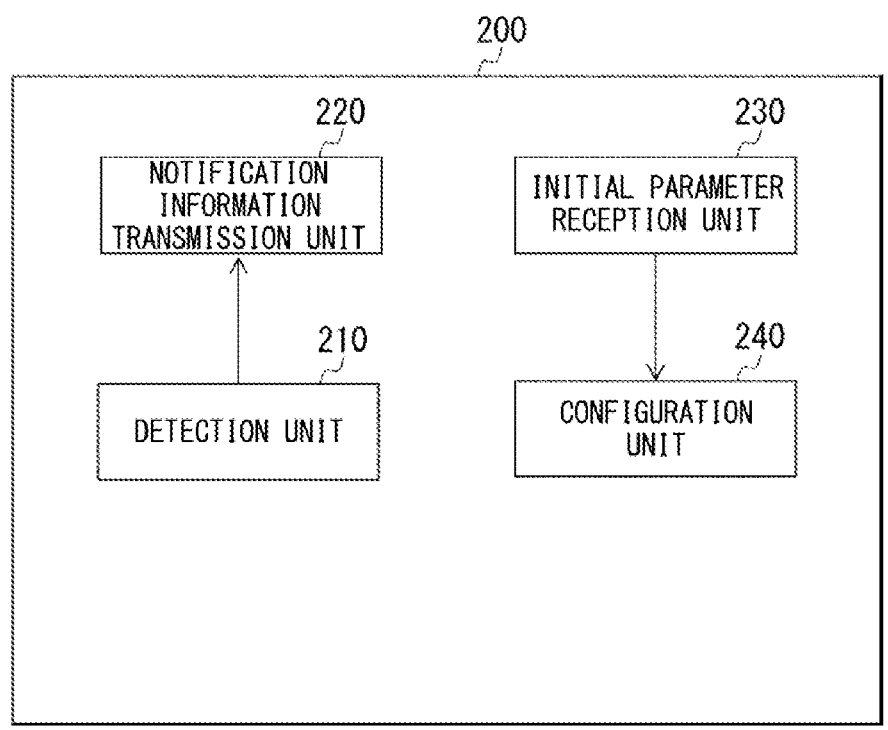
FIG. 4 is a block diagram showing a configuration of a radio apparatus according to the first embodiment of the present disclosure.

With reference next to FIG. 4, a configuration of the radio apparatus 200 according to the first embodiment of the present disclosure will be explained. The radio apparatus 200 includes a detection unit 210, a notification information transmission unit 220, an initial parameter reception unit 230, and a configuration unit 240.

The detection unit 210 detects information on the radio apparatus 200. That is, the detection unit 210 detects information configured in the radio apparatus 200, information indicating the range that can be configured in the radio apparatus 200, or information indicating the configuration of the radio apparatus 200. These kinds of information detected by the detection unit 210 are information determined before the radio apparatus 200 is able to communicate with the monitoring apparatus 100. Further, the detection unit 210 executes the detection before the first communication with the monitoring apparatus 100 is performed. The detection unit 210 may perform the detection at any time before the first communication with the monitoring apparatus 100 is performed. Further, the detection unit 210 outputs the information on the radio apparatus 200 that has been detected to the notification information transmission unit 220.

The notification information transmission unit 220 receives the information on the radio apparatus 200 from the detection unit 210. Further, the notification information transmission unit 220 transmits the information on the radio apparatus 200 that has been received to the monitoring apparatus 100 as the notification information.

The initial parameter reception unit 230 receives the initial parameter determined based on the notification information from the monitoring apparatus 100. Further, the initial parameter reception unit 230 outputs the initial parameter that has been received to the configuration unit 240. The configuration unit 240 configures the initial parameter that has been received as the initial parameter of the radio apparatus 200.

Figure 5:
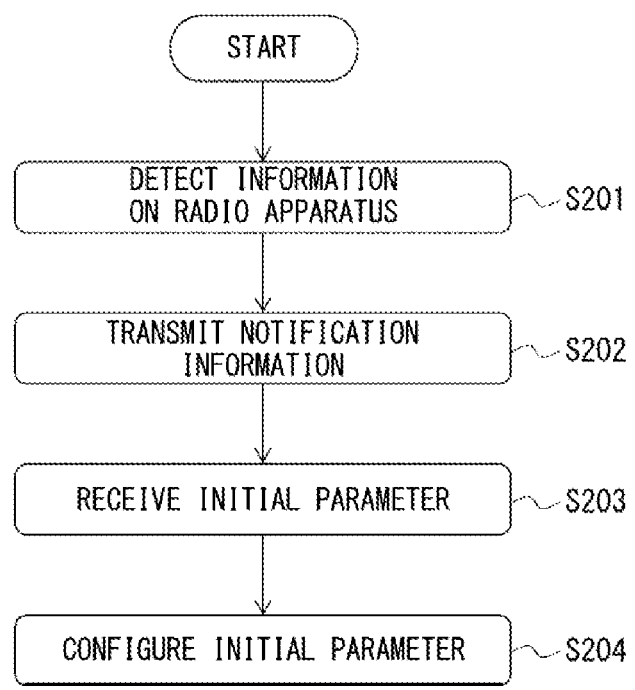
FIG. 5 is a flowchart showing processing of the radio apparatus according to the first embodiment of the present disclosure.

With reference next to the flowchart shown in FIG. 5, processing of the radio apparatus 200 according to the first embodiment of the present disclosure will be explained.

First, the detection unit 210 detects the information on the radio apparatus 200 (S201). That is, the detection unit 210 detects the information configured in the radio apparatus 200, the information indicating the range that can be configured in the radio apparatus 200, or the information indicating the configuration of the radio apparatus 200. Next, the notification information transmission unit 220 transmits the information on the radio apparatus 200 to the monitoring apparatus 100 as the notification information (S202). Next, the initial parameter reception unit 230 receives the initial parameter determined based on the notification information from the monitoring apparatus 100 (S203). Next, the configuration unit 240 configures the received initial parameter as the initial parameter of the radio apparatus 200 (S204).

As described above, the radio apparatus 200 according to the first embodiment is configured to transmit the information on the radio apparatus 200 that has been detected to the monitoring apparatus 100 as the notification information, receive the initial parameter determined based on the notification information from the monitoring apparatus 100, and configure the received initial parameter as the initial parameter of the radio apparatus 200. It is therefore possible to achieve the radio apparatus 200 capable of automating the initial parameter configuration in accordance with the purpose of installing the radio apparatus 200.

As described above, the communication system according to the first embodiment includes the monitoring apparatus 100 and the radio apparatus 200 described above. It is therefore possible to achieve the communication system capable of automating the initial parameter configuration in accordance with the purpose of installing the radio apparatus.

Second Embodiment

In a second embodiment, an example in which the configuration and the operations of the first embodiment stated above are further specified will be explained. A communication system according to the second embodiment includes an NMS 300 and a radio apparatus 400. Further, the communication system according to the second embodiment uses a set of profiles composed of a plurality of profiles for bandwidth control as the initial parameter. Further, the communication system according to the second embodiment uses information indicating the modulation scheme of the radio apparatus 400 and the network address of the radio apparatus 400 as the notification information. Since the configuration of the NMS 300 is similar to that of the monitoring apparatus 100 according to the first embodiment, the explanation thereof will be omitted. Further, since the configuration of the radio apparatus 400 is similar to that of the radio apparatus 200 according to the first embodiment, the explanation thereof will be omitted.

Figure 6:
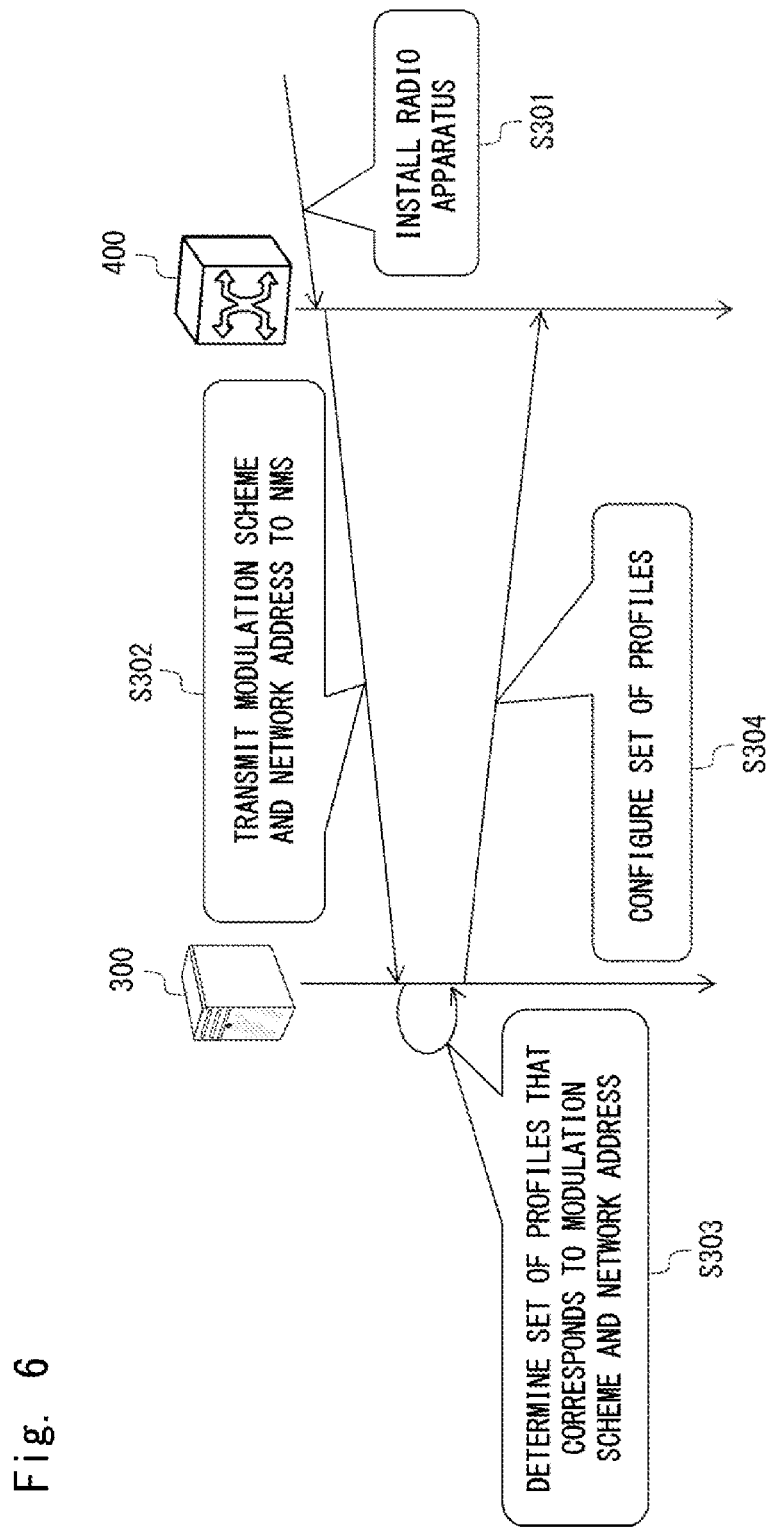
FIG. 6 is a sequence diagram showing an outline of the whole processing of a communication system according to a second embodiment of the present disclosure.

With reference to the sequence diagram shown in FIG. 6, an outline of the whole processing of the communication system according to the second embodiment of the present disclosure will be explained. First, the radio apparatus 400 is installed (S301). The radio apparatus 400 is installed by, for example, a construction worker.

When the radio apparatus 400 becomes able to communicate with the NMS 300 after the completion of the installation work, the radio apparatus 400 transmits the information indicating the modulation scheme of the radio apparatus 400 and the network address of the radio apparatus 400 to the NMS 300 as the information on the radio apparatus 400 that has been detected (S302). The information indicating the modulation scheme of the radio apparatus 400 is the information indicating the modulation scheme that the radio apparatus 400 uses or the information indicating the range of the modulation scheme that the radio apparatus 400 can use.

Further, the information indicating the modulation scheme that the radio apparatus 400 uses means information indicating the modulation scheme that the radio apparatus 400 uses when it communicates with another radio apparatus. Since the information indicating the modulation scheme that the radio apparatus 400 uses is information configured in the radio apparatus 400, this information can also be called information indicating the modulation scheme configured in the radio apparatus 400.

Further, the information indicating the range of the modulation scheme that the radio apparatus 400 can use is, for example, information that is used when the radio apparatus 400 includes an adaptive modulation function. A specific example of the information indicating the range of the modulation scheme that the radio apparatus 400 can use is information indicating the range (width) of the modulation scheme when, for example, 16 Quadrature Amplitude Modulation (QAM)-256 QAM are available by adaptive modulation. Since the information indicating the range of the modulation scheme that the radio apparatus 400 can use is information indicating the range that can be configured in the radio apparatus 400, this information can also be called information indicating the range of the modulation scheme that can be configured in the radio apparatus 400.

Next, the NMS 300 determines the set of the profiles that corresponds to the information indicating the modulation scheme of the radio apparatus 400 and the network address of the radio apparatus 400 that have been received (S303). A method of determining the set of the profiles will be explained in detail with reference to FIG. 7.

Next, the NMS 300 configures the set of the profiles that has been determined in the radio apparatus 400 (S304). The configuration of the set of the profiles in the radio apparatus 400 is performed, for example, by the NMS 300 transmitting the set of the profiles to the radio apparatus 400 and the radio apparatus 400 configuring the set of the profiles that has been received in the radio apparatus 400. Further, the NMS 300 may autonomously configure the set of the profiles for the radio apparatus 400 by transmitting the configuration command to the radio apparatus 400 together with the set of the profiles.

Figure 7:
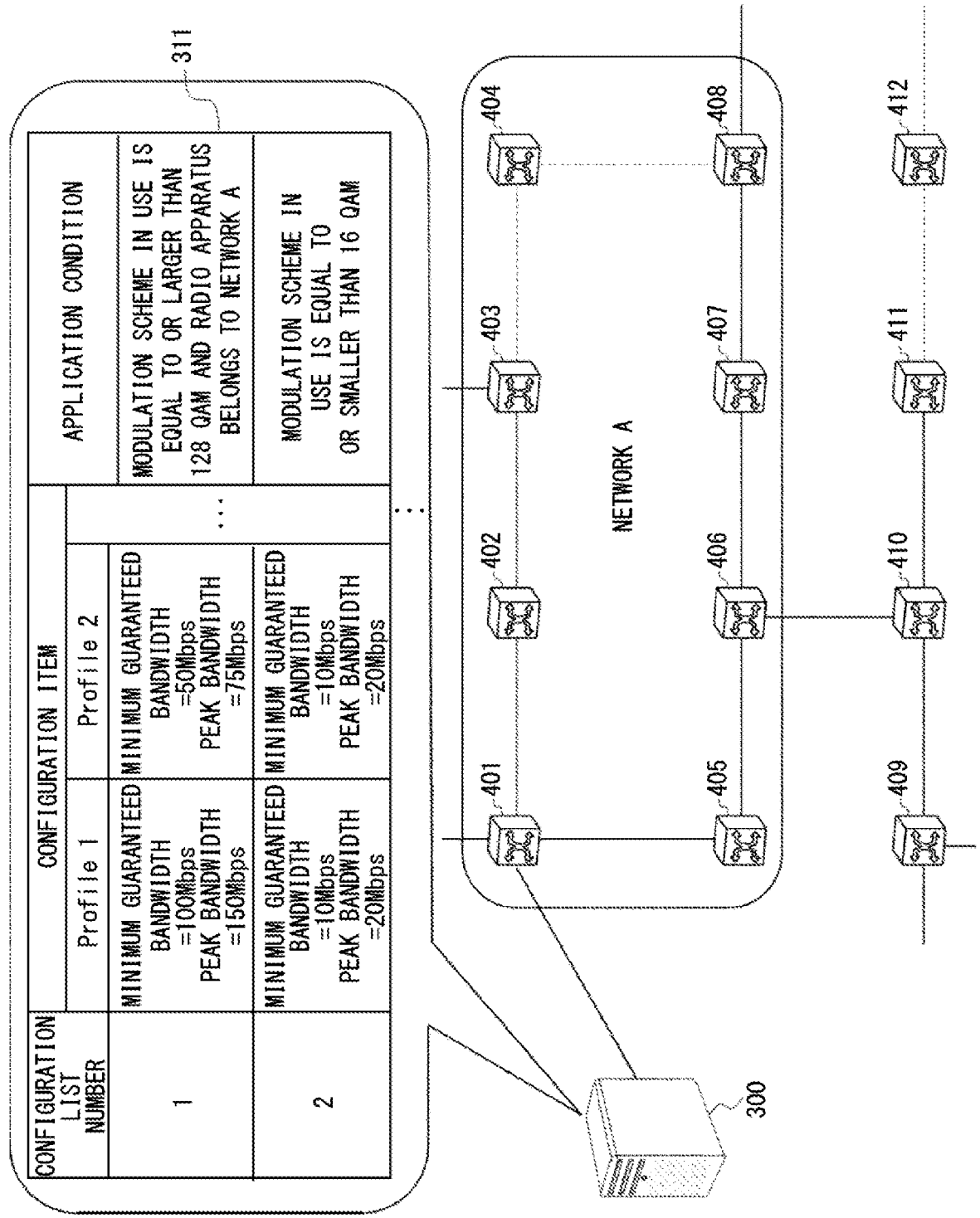
FIG. 7 is a diagram for explaining an application example of the communication system according to the second embodiment of the present disclosure.

With reference next to FIG. 7, an application example of the communication system according to the second embodiment of the present disclosure will be explained. The communication system shown in FIG. 7 includes an NMS 300 and radio apparatuses 401-412. Further, the NMS 300 holds a table for initial parameters 311. Further, the radio apparatuses 401-408 belong to a network A. The network A is a core network.

The table for initial parameters 311 holds the set of the profiles and the application condition thereof in association with each other for each of the configuration list numbers. In the example shown in FIG. 7, a configuration list number 1 is a combination of the set of the profiles for the core network and the application condition thereof. Further, a configuration list number 2 is a combination of the set of the profiles for the access network and the application condition thereof. Further, the set of the profiles, which is the configuration item, includes a plurality of profiles (Profile 1, Profile 2, . . . ). Each of the number of combinations of the set of the profiles and the application condition thereof included in the table for initial parameters 311, and the number of profiles included in the set of the profiles, may be set to a desired number.

Each profile defines a minimum guaranteed bandwidth and a peak bandwidth. In the example shown in FIG. 7, the minimum guaranteed bandwidth of the Profile 1 of the configuration list number 1 is 100 Mbps and the peak bandwidth thereof is 150 Mbps. Further, the minimum guaranteed bandwidth of the Profile 2 of the configuration list number 1 is 50 Mbps and the peak bandwidth thereof is 75 Mbps. Further, the minimum guaranteed bandwidth of the Profile 1 of the configuration list number 2 is 10 Mbps and the peak bandwidth thereof is 20 Mbps. Further, the minimum guaranteed bandwidth of the Profile 2 of the configuration list number 2 is 10 Mbps and the peak bandwidth thereof is 20 Mbps. The minimum guaranteed bandwidth and the peak bandwidth of each profile may be defined as appropriate.

Further, in the configuration list number 1, the application condition is that the modulation scheme in use is equal to or larger than 128 QAM and the radio apparatus belongs to the network A. Further, in the configuration list number 2, the application condition is that the modulation scheme in use is equal to or smaller than 16 QAM. The content of the application condition may be defined as appropriate.

Next, with reference to FIG. 7, a method of determining the set of the profiles will be explained. First, the processing of determining the set of the profiles when the radio apparatus 404 is installed will be explained. When the radio apparatus 404 becomes able to communicate with the NMS 300 after the completion of the installation work, the radio apparatus 404 transmits the information indicating the modulation scheme that the radio apparatus 404 uses and the network address of the radio apparatus to the NMS 300. The modulation scheme that the radio apparatus 404 uses is 128 QAM.

The NMS 300 receives the information indicating the modulation scheme that the radio apparatus 404 uses and the network address of the radio apparatus 404. Further, the NMS 300 recognizes that the information indicating the modulation scheme that the radio apparatus 404 uses is 128 QAM. Further, the NMS 300 determines that the network address of the radio apparatus 404 is an address that belongs to the network A. That the network address is the address that belongs to the network A can be determined by identifying that the network address is larger than a predetermined address band.

The NMS 300 determines that the information indicating the modulation scheme that the radio apparatus 404 uses and the network address of the radio apparatus 404 match the application condition of the configuration list number 1 by referring to the table for initial parameters 311. Then the NMS 300 determines to apply the set of the profiles for the core network of the configuration list number 1 to the radio apparatus 404. That is, the NMS 300 determines that the set of the profiles that corresponds to the information indicating the modulation scheme that the radio apparatus 404 uses and the network address of the radio apparatus 404 that have been received is the set of the profiles for the core network of the configuration list number 1.

Next, a process for determining the set of the profiles when the radio apparatus 412 is installed will be explained. When the radio apparatus 412 becomes able to communicate with the NMS 300 after the completion of the installation work, the radio apparatus 412 transmits the information indicating the modulation scheme that the radio apparatus 412 uses and the network address of the radio apparatus 412 to the NMS 300. It is assumed that the modulation scheme that the radio apparatus 412 uses is 16 QAM.

The NMS 300 receives the information indicating the modulation scheme that the radio apparatus 412 uses and the network address of the radio apparatus 412. Further, the NMS 300 recognizes that the information indicating the modulation scheme that the radio apparatus 412 uses is 16 QAM. Further, the NMS 300 determines that the network address of the radio apparatus 412 is not the address that belongs to the network A.

The NMS 300 determines that the information indicating the modulation scheme that the radio apparatus 412 uses and the network address of the radio apparatus 412 match the application condition of the configuration list number 2 by referring to the table for initial parameters 311. Then the NMS 300 determines to apply the set of the profiles for the access network of the configuration list number 2 to the radio apparatus 412. That is, the NMS 300 determines that the set of the profiles that corresponds to the information indicating the modulation scheme that the radio apparatus 412 uses and the network address of the radio apparatus 412 that have been received is the set of the profiles for the access network of the configuration list number 2.

As described above, the communication system according to the second embodiment is configured to use the set of the profiles composed of the plurality of profiles for controlling bandwidth as the initial parameter and to use the information indicating the modulation scheme of the radio apparatus 400 and the network address of the radio apparatus 400 as the notification information. It is therefore possible to automate the configuration of the set of the profiles composed of the plurality of profiles for controlling bandwidth in accordance with the purpose of installing the radio apparatus.

Third Embodiment

In a third embodiment, an example in which the configuration and the operations of the second embodiment described above are further specified will be explained. A communication system according to the third embodiment includes, similar to the second embodiment, an NMS 300 and a radio apparatus 400. Further, the NMS 300 includes the table for initial parameters 311 shown in FIG. 7. Further, the NMS 300 includes a function of adding, deleting, and changing of a VLAN flow. Further, the NMS 300 includes a function of determining the profile to be used for the VLAN flow and specifying the profile for the radio apparatus 400 when the VLAN flow is added or changed.

Figure 8:
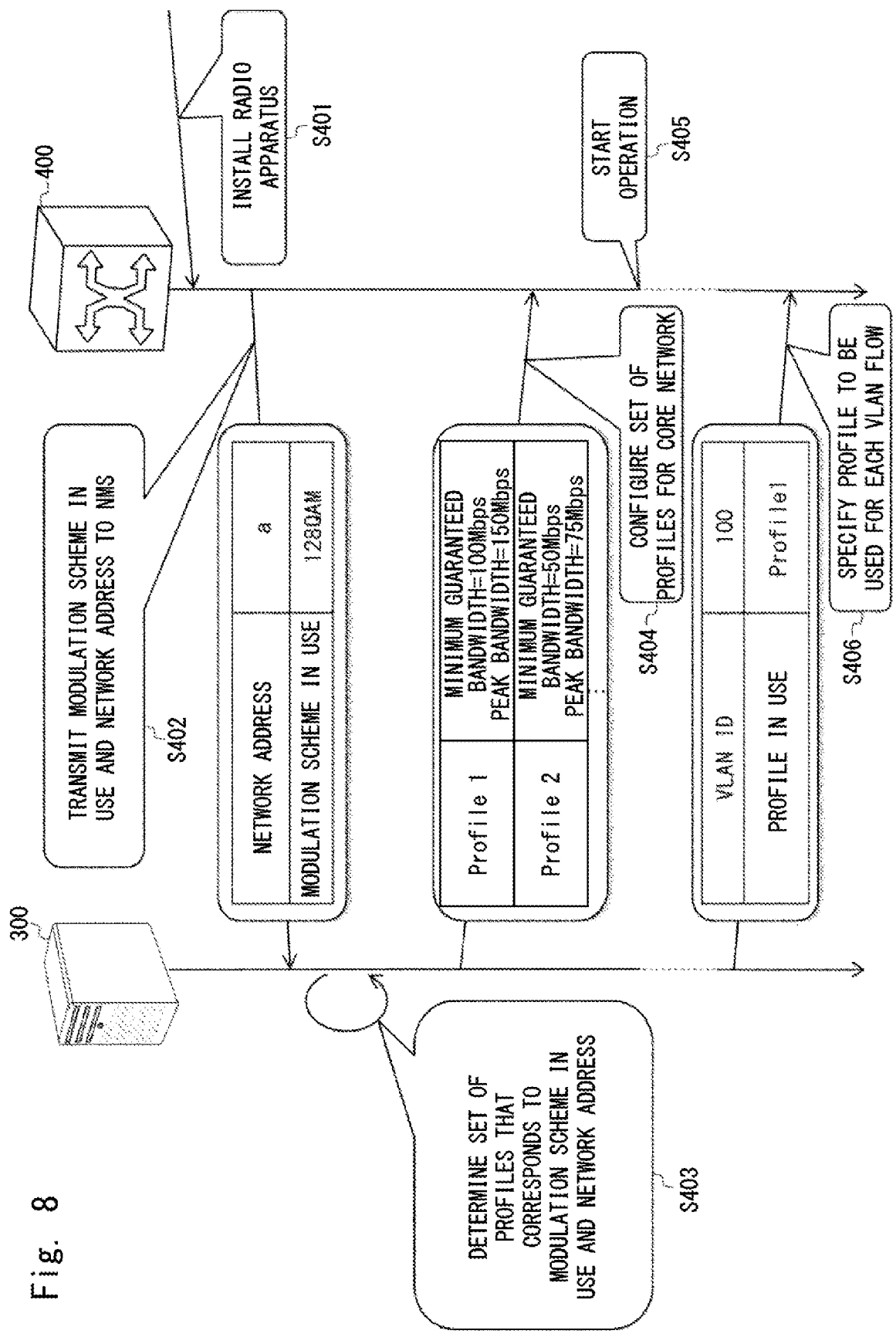
FIG. 8 is a sequence diagram showing an outline of the whole processing of a communication system according to a third embodiment of the present disclosure.

With reference to the sequence diagram shown in FIG. 8, an outline of the whole processing of the communication system according to the third embodiment of the present disclosure will be explained. First, the radio apparatus 400 is installed (S401). The radio apparatus 400 is installed by, for example, a construction worker.

When the radio apparatus 400 becomes able to communicate with the NMS 300 after the completion of the installation work, the radio apparatus 400 transmits the information indicating the modulation scheme that the radio apparatus 400 uses and the network address to the NMS 300 as the information on the radio apparatus 400 that has been detected (S402). The information indicating the modulation scheme that the radio apparatus 400 uses is 128 QAM and the network address of the radio apparatus 400 is a.

Next, the NMS 300 determines the set of the profiles that corresponds to the information indicating the modulation scheme that the radio apparatus 400 uses and the network address of the radio apparatus 400 (S403). Specifically, the NMS 300 recognizes that the information indicating the modulation scheme that the radio apparatus 400 uses is 128 QAM. Further, the NMS 300 determines that the network address a of the radio apparatus 400 is an address that belongs to the network A. Further, the NMS 300 determines that the information indicating the modulation scheme that the radio apparatus 400 uses and the network address of the radio apparatus 400 match the application condition of the configuration list number 1 by referring to the table for initial parameters 311. Then the NMS 300 determines that the set of the profiles for the core network of the configuration list number 1 should be applied to the radio apparatus 400. That is, the NMS 300 determines that the set of the profiles that corresponds to the information indicating the modulation scheme that the radio apparatus 400 uses and the network address of the radio apparatus 400 that have been received is the set of the profiles for the core network of the configuration list number 1.

Next, the NMS 300 configures the set of the profiles for the core network that has been determined in the radio apparatus 400 (S404). Since the method of configuring the set of the profiles in the radio apparatus 400 is similar to the one described in the second embodiment, the descriptions thereof will be omitted.

Next, the radio apparatus 400 starts operating after configuring the set of the profiles (S405). After the operation of the radio apparatus 400 is started, the NMS 300 specifies the profile to be used for each Virtual Local Area Network (VLAN) flow for the radio apparatus 400 (S406). In the example shown in FIG. 8, of the set of the profiles configured in the radio apparatus 400, the Profile 1 is allocated to the VLAN flow in which the VLAN ID is 100. The VLAN ID is an ID (identification information) that is used for the purpose of identifying the VLAN flow.

Next, the method of determining the profile to be used for the VLAN flow will be explained. The NMS 300 determines the profile to be used for the VLAN flow when the VLAN flow is added or changed. The profile to be used for the VLAN flow is determined in accordance with, for example, the amount of data of the VLAN flow, the fee to be charged to the user apparatus, which will be the target of the VLAN flow, or the number of other VLAN flows that have already been configured. The amount of data of the VLSN flow to be added or changed, the fee charged to the user apparatus, which will be the target of the VLAN flow to be added or changed, and the number of the other VLAN flows that have already been configured are collectively called three parameters. While the profile is typically specified by the operator based on the three parameters, the specification of the profile can be automated by the means explained below.

The determination in accordance with the amount of data of the VLAN flow to be added or changed is performed in such a way that, for example, the Profile 1 should be used when the amount of data of the VLAN flow is equal to or larger than a predetermined threshold and the Profile 2 should be used when it is smaller than the predetermined threshold.

Further, the determination in accordance with the fee charged to the user apparatus, which will be the target of the VLAN flow to be added or changed, is performed in such a way that, for example, the Profile 1 should be used when the fee to be charged to the user apparatus, which will be the target of the VLAN flow, is equal to or larger than a predetermined threshold and the Profile 2 should be used when this fee is smaller than the predetermined threshold.

Further, the determination in accordance with the number of the other VLAN flows that have already been configured may be performed in such a way that, for example, the Profile 1 should be used when the number of the other VLAN flows that have already been configured is smaller than the predetermined threshold and the Profile 2 should be used when this number is equal to or larger than the predetermined threshold.

While the example in which the profile is determined based on one of the three parameters has been described in the aforementioned example, the profile may be determined in consideration of all the three parameters. In this case, the profile may be determined, for example, by comparing the three parameters with the predetermined thresholds that correspond to the three respective parameters.

The determination may be made in such a way that the Profile 1 should be used when all the three parameters satisfy the predetermined threshold as a result of the comparison and otherwise the Profile 2 should be used. The case in which all the three parameters satisfy the predetermined threshold is a case in which the amount of data of the VLAN flow to be added or changed and the fee charged to the user apparatus, which will be the target of the VLAN flow to be added or changed, is equal to or larger than the predetermined thresholds and the number of the other VLAN flows that have already been configured is smaller than the corresponding predetermined threshold.

Further, as a result of the comparison, the profile to be used may be determined in terms of the majority decision of the three parameters. That is, the determination may be performed in such a way that the Profile 1 should be used when two of the three parameters satisfy the predetermined thresholds and otherwise the Profile 2 should be used.

While the case in which any one of the two profiles, that is, the Profile 1 and the Profile 2, is determined has been described in the aforementioned example, it is merely an example and one of the three or more profiles may be determined. In this case, by using the threshold of the number in accordance with the number of profiles, it is possible to make a determination for each of the three parameters. When, for example, one of the three profiles is determined, two thresholds may be used for each of the three parameters.

While the case in which three parameters are used have been described in the aforementioned example, the number of parameters may be any number. When the aspect of the majority decision of the parameters is employed, the number of parameters is preferably set to an odd number.

As described above, in the communication system according to the third embodiment, similar to the communication system according to the second embodiment, it is possible to automate the configuration of the set of the profiles composed of the plurality of profiles for controlling bandwidth in accordance with the purpose of installing the radio apparatus.

Further, in the communication system according to the third embodiment, after the operation of the radio apparatus 400 is started, the NMS 300 is configured to specify the profile to be used for each VLAN flow for the radio apparatus 400. It is therefore possible to automate also the configuration of the profile to be used for the VLAN flow after the operation of the radio apparatus 400 is started.

Other Embodiments

While using the information indicating the modulation scheme of the radio apparatus and the network address of the radio apparatus as the notification information has been explained in the aforementioned examples, this is merely an example and other types of information may be used. For example, in place of the information indicating the modulation scheme of the radio apparatus, information indicating the frequency that the radio apparatus uses, the frequency bandwidth that the radio apparatus can use, or the configuration of the radio apparatus may be used. The frequency that the radio apparatus uses and the frequency bandwidth that the radio apparatus can use may be determined by hardware limitations in the radio apparatus, limitations in the communication system in terms of the network specification, or license limitations. Further, the configuration of the radio apparatus is information regarding the number of ports that the radio apparatus has, the frequency that is available for the specific port or the like.

Note that the network address of the radio apparatus may not be used as the notification information. That is, only the information indicating the modulation scheme of the radio apparatus, the information indicating the frequency that the radio apparatus uses, the frequency bandwidth that the radio apparatus can use, or the configuration of the radio apparatus may be used as the notification information. When, for example, only the information indicating the modulation scheme of the radio apparatus is used as the notification information, it can be interpreted that the radio apparatus belongs to the core network and it may be possible to determine that the set of the profiles for the core network should be used when the modulation scheme that the radio apparatus uses is equal to or larger than 128 QAM. Further, when, for example, only the configuration of the radio apparatus is used as the notification information, it can be interpreted that the radio apparatus belongs to the core network and it may be possible to determine that the set of the profiles for the core network should be used when the number of ports that the radio apparatus has is equal to or larger than the predetermined value.

Further, while the explanation has been made taking the case in which the set of the profiles is used as the initial parameter as an example in the aforementioned examples, it is merely an example and other parameters may be used. An access list may be, for example, used as the initial parameter. The access list is a list that controls access to the radio apparatus. The access list stores, for example, a plurality of Internet Protocols (IPs) that is permitted the radio apparatus to pass communication, a plurality of ports that is permitted the radio apparatus to pass communication or the like. When, for example, it is determined that the radio apparatus that has transmitted the notification information is a radio apparatus that belongs to the core network, the monitoring apparatus determines that the access list for the core network should be applied to the radio apparatus. The access list for the core network means the access list that holds a plurality of permission IPs, a plurality of permission ports or the like for the radio apparatus that belongs to the core network. Both the set of the profiles and the access list may be used as the initial parameter.

Further, while the case in which the configuration of the profile to be used for the VLAN flow after the operation of the radio apparatus has been started is also automated has been explained in the aforementioned examples, it is merely an example and the configuration of the profile may not be automated. For example, the configuration of the profile to be used for the VLAN flow may be determined by the operator by taking into consideration the aforementioned three parameters and the like.

Note that each processing in the aforementioned embodiments may be executed by software. That is, a computer program for performing each processing may be read by a Central Processing Unit (CPU) included in the monitoring apparatus and the radio apparatus and executed by this CPU. Even when each processing is performed using the program, processing that is the same as the processing according to the aforementioned embodiments may be performed. The aforementioned program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program(s) may be provided to a computer using any type of transitory computer readable media. Examples of transitory computer readable media include electric signals, optical signals, and electromagnetic waves.

Transitory computer readable media can provide the program to a computer via a wired communication line (e.g., electric wires, and optical fibers) or a wireless communication line.

Note that the present disclosure is not limited to the aforementioned embodiments and may be changed as appropriate without departing from the spirit of the present disclosure.

While the present disclosure has been explained above by referring to the embodiments, the present disclosure is not limited to the aforementioned description. Various changes that can be understood by one skilled in the art may be made to the configurations and the details of the present disclosure within the scope of the present disclosure.

This application is based upon and claims the benefit of priority from Japanese Patent Application No. 2015-160851, filed on Aug. 18, 2015, the disclosure of which is incorporated herein in its entirety by reference.

REFERENCE SIGNS LIST

100 MONITORING APPARATUS
110 NOTIFICATION INFORMATION RECEPTION UNIT
120 DETERMINATION UNIT
130 INITIAL PARAMETER TRANSMISSION UNIT
200 RADIO APPARATUS
210 DETECTION UNIT
220 NOTIFICATION INFORMATION TRANSMISSION UNIT
230 INITIAL PARAMETER RECEPTION UNIT
240 CONFIGURATION UNIT

The invention claimed is:

1. A monitoring apparatus comprising:
at least one memory storing instructions, and
at least one processor configured to execute the instructions to:
receive notification information from a radio apparatus, wherein the notification information is associated with a recent installation of the radio apparatus and comprises information indicating a modulation scheme that the radio apparatus uses or a range of a modulation scheme that the radio apparatus can use;
determine a bandwidth control template or an access list based on the modulation scheme or the range; and
transmit, in response to the notification information, the determined bandwidth control template or the determined access list to the radio apparatus, wherein
the monitoring apparatus is a first network apparatus other than a base station,
the radio apparatus is a second network apparatus other than the first network apparatus, and
the second network apparatus is included in the access network or the core network.

2. A radio apparatus comprising:
at least one memory storing instructions, and
at least one processor configured to execute the instructions to:
detect information on the radio apparatus, the information indicating a modulation scheme that the radio apparatus uses or a range of a modulation scheme that the radio apparatus can use;
transmit the information that has been detected to a monitoring apparatus as notification information, wherein the notification information is associated with a recent installation of the radio apparatus;
receive a bandwidth control template or an access list determined based on the modulation scheme or the range from the monitoring apparatus; and
configure the bandwidth control template or the access list that has been received as an initial parameter of the radio apparatus, wherein
the monitoring apparatus is a first network apparatus other than a base station,
the radio apparatus is a second network apparatus other than the first network apparatus, and
the second network apparatus is included in the access network or the core network.

3. A communication system comprising a monitoring apparatus and a radio apparatus, wherein
the monitoring apparatus comprises:
at least one memory storing instructions, and
at least one processor configured to execute the instructions to:
receive notification information from the radio apparatus, wherein the notification information is associated with a recent installation of the radio apparatus and comprises information indicating a modulation scheme that the radio apparatus uses or a range of a modulation scheme that the radio apparatus can use;
determine a bandwidth control template or an access list based on the modulation scheme or the range; and
transmit, in response to the determined bandwidth control template or the determined access list, the initial parameter that has been determined to the radio apparatus, and
the radio apparatus comprises:
at least one memory storing instructions, and
at least one processor configured to execute the instructions to;
detect information on the radio apparatus, the detected information indicating a modulation scheme that the radio apparatus uses or a range of a modulation scheme that the radio apparatus can use;
transmit the information that has been detected to the monitoring apparatus as the notification information;
receive the determined bandwidth control template or the determined access list from the monitoring apparatus; and
configure the determined bandwidth control template or the determined access list that has been received as an initial parameter of the radio apparatus, wherein
the monitoring apparatus is a first network apparatus other than a base station,
the radio apparatus is a second network apparatus other than the first network apparatus, and the second network apparatus is included in the access network or the core network.

4. A method in a monitoring apparatus, the method comprising:
receiving notification information from a radio apparatus, wherein the notification information is associated with a recent installation of the radio apparatus and comprises information indicating a modulation scheme that the radio apparatus uses or a range of a modulation scheme that the radio apparatus can use;
determining a bandwidth control template or an access list based on the modulation scheme or the range; and
transmitting, in response to the notification information, the determined bandwidth control template or the determined access list to the radio apparatus, wherein the monitoring apparatus is a first network apparatus other than a base station,
the radio apparatus is a second network apparatus other than the first network apparatus, and
the second network apparatus is included in the access network or the core network.

5. A method in a radio apparatus, the method comprising:
detecting information on the radio apparatus, the information indicating a modulation scheme that the radio apparatus uses or a range of a modulation scheme that the radio apparatus can use;
transmitting the information that has been detected to a monitoring apparatus as notification information, wherein the notification information is associated with a recent installation of the radio apparatus;
receiving a bandwidth control template or an access list determined based on the modulation scheme or the range from the monitoring apparatus; and
configuring the bandwidth control template or the access list that has been received as an initial parameter of the radio apparatus, wherein
the monitoring apparatus is a first network apparatus other than a base station,
the radio apparatus is a second network apparatus other than the first network apparatus, and
the second network apparatus is included in the access network or the core network.

\* \* \* \* \*